US008683207B2

(12) United States Patent
Farkas et al.

(10) Patent No.: US 8,683,207 B2
(45) Date of Patent: Mar. 25, 2014

(54) UPDATING SIGNATURE ALGORITHMS FOR STRONG NAME BINDING

(75) Inventors: Shawn Farkas, Kirkland, WA (US); Mueez Siddiqui, Mississauga (CA); Reid Martin Borsuk, Bellevue, WA (US); Andrew Dai, Seattle, WA (US); Arun Moorthy, Newcastle, WA (US)

(73) Assignee: Microsoft Corporation, Redmond, WA (US)

( * ) Notice: Subject to any disclaimer, the term of this patent is extended or adjusted under 35 U.S.C. 154(b) by 113 days.

(21) Appl. No.: 13/330,260

(22) Filed: Dec. 19, 2011

(65) Prior Publication Data

US 2013/0159718 A1    Jun. 20, 2013

(51) Int. Cl.
*H04L 9/32* (2006.01)

(52) U.S. Cl.
USPC ........... 713/176; 713/171; 713/186; 713/187; 726/22; 709/225

(58) Field of Classification Search
USPC .................... 713/176, 186, 171, 187; 726/22; 709/225
See application file for complete search history.

(56) References Cited

U.S. PATENT DOCUMENTS

| 7,966,599 B1* | 6/2011 | Malasky et al. ............... 717/100 |
| 8,200,983 B1* | 6/2012 | Victorov ....................... 713/187 |
| 2004/0054779 A1* | 3/2004 | Takeshima et al. ........... 709/225 |
| 2004/0148514 A1* | 7/2004 | Fee et al. ...................... 713/200 |
| 2005/0132194 A1* | 6/2005 | Ward ............................ 713/176 |
| 2006/0059350 A1* | 3/2006 | Cantwell et al. .............. 713/176 |
| 2007/0067634 A1* | 3/2007 | Siegler ......................... 713/171 |
| 2007/0288758 A1* | 12/2007 | Weiss ............................ 713/186 |

OTHER PUBLICATIONS

"Creating and Using Strong-Name Assemblies", retrieved on Dec. 1, 2011, Available at: http://msdn.microsoft.com/en-us/library/xwb8f617(v=vs.100).aspx.
Rector, Brent. "Giving a .NET Assembly a Strong Name", Dec. 23, 2003, Available at: http://www.codeguru.com/columns/experts/article.php/c4643.
"How to: Reference a Strong-Named Assembly", retrieved on Dec. 1, 2011, Available at: http://msdn.microsoft.com/en-us/library/s1sx4kfb.aspx.
"How to: Sign an Assembly with a Strong Name", retrieved on Dec. 1, 2011, Available at: http://msdn.microsoft.com/en-us/library/xc31ft41.aspx.
Seda, Jan, "Strong Names Explained", Nov. 25, 2004, Available at: http://www.codeproject.com/Articles/8874/Strong-Names-Explained.
Downen, Mike. "CLR Inside Out: Using Strong Name Signatures." MSDN Magazine Jul. 2006, Available at: http://msdn.microsoft.com/en-us/magazine/cc163583.aspx.

\* cited by examiner

*Primary Examiner* — Thuong Nguyen
(74) *Attorney, Agent, or Firm* — Brian Haslam; Kevin Sullivan; Micky Minhas (57) ABSTRACT

The present invention extends to methods, systems, and computer program products for updating signature algorithms used for signing an assembly with a strong name without changing the identity of the assembly. The present invention enables an assembly that has already been given an identity (via strong name signing with an identity public/private key pair) to be resigned with a different public/private key pair without changing the original identity that was based on the identity public/private key pair. This is accomplished by including a counter signature within the assembly that links the original identity of the assembly to the new signature key pair.

22 Claims, 6 Drawing Sheets

UPDATING SIGNATURE ALGORITHMS FOR STRONG NAME BINDING

CROSS-REFERENCE TO RELATED APPLICATIONS

Not Applicable.

BACKGROUND

1. Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

Software frameworks, such as Microsoft's .NET framework, are used to execute applications. Such frameworks consist of a runtime and a library. For example, the .NET framework consists of the Common Language Runtime (CLR) and a class library. The library in general implements common functionality that is made accessible to applications via application programming interfaces. When the runtime of a framework executes an application, it determines which portions of the framework's library are used by the application and loads those portions. In the .NET framework, these portions are referred to as assemblies. In this specification, the term assembly, however, is used generally to refer to an identifiable grouping of code that provides functionally that can be utilized by other code. Assembly can be equated with library within this specification. In this sense, a Java Archive (Jar) file can be considered an assembly.

When an application is designed to be executed on a particular framework, the application generally references assemblies available in the framework. When the application is executed on the framework, the referenced assemblies are loaded and executed as well. Because of this, it is desirable to protect the security of an assembly so that it can be ensured that the assembly has not been modified by anyone other than the publisher of the assembly.

Figure 1:
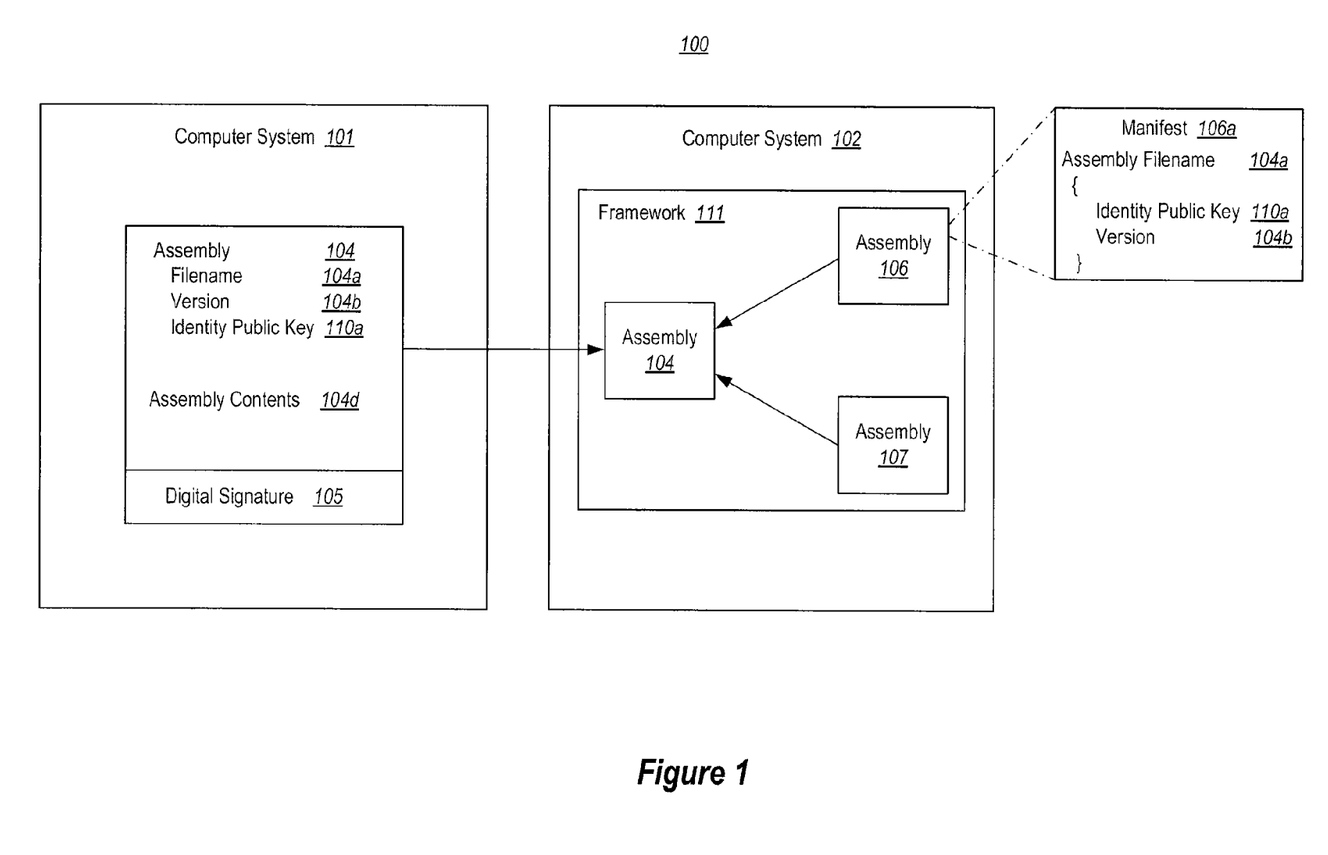
FIG. 1 illustrates an example computer architecture in which strong name assemblies are used.

One approach for securing an assembly is known as strong name signing and is depicted in computer architecture 100 in FIG. 1. An assembly 104 is signed with a strong name, generally at compile time, by the owner of the assembly (e.g. on computer system 101). To sign assembly 104 with a strong name, assembly 104 is given a unique identity that may comprise an identifier of the assembly (e.g. file name 104a, version 104b) and a public key 110a of a public/private key pair. In this specification, this public/private key pair is referred to as the identity public/private key pair.

A cryptographic digest of the contents 104d of the assembly is also generated. Then, a digital signature 105 of this digest is created using the identity private key of the identity public/private key pair. This digital signature 105 is stored within the assembly. Accordingly, a strong name comprises a unique identity of the assembly which includes the identity public key, and the digital signature of the digest using the identity private key.

Once signed with a strong name, these assemblies are made available for use by other software components (e.g. other assemblies 106, 107 executed within framework 111 on computer system 102). For example, one company may release a strong named assembly for use within the .NET framework. Whenever another assembly (e.g. assemblies 106, 107) that references the strong named assembly 104 is built, information about the strong named assembly (as well as any other assemblies referenced by the other assembly) is stored. For example, when an assembly for the .NET framework is built that references strong named assembly 104, information is added to a manifest (e.g. 106a) for the built assembly that identifies that the assembly references strong named assembly 104 (e.g. by including the filename 104a, version 104b, and public key 110a of the referenced assembly 104). This information is based on the identity of the strong named assembly.

Subsequently, when assembly 106 is executed within framework 111, the loader determines which assemblies to load based on the information in manifest 106a. In other words, the loader will use the stored identity to look for the strong named assembly 104. Before loading the strong named assembly, framework 111 will verify the identity of the strong named assembly (e.g. as a means to verify that the assembly has not been tampered with). This verification is done by extracting the identity public key from the identity of the assembly, using the identity public key to decrypt the digital signature of the digest, generating a cryptographic digest of the contents of the assembly, and comparing the decrypted digest to the generated digest. If the digests match, then it is known that the digital signature of the digest was generated using the identity private key, and the assembly will be loaded.

This approach works as long as the identity private key is kept secure and the algorithm used to sign the digest with the identity private key is not known. However, many identity private keys as well as the algorithms used to generate digital signatures with such identity private keys are no longer secure. For example, if a second party obtains a first party's private key, the second party can modify (e.g. add malicious code to) the first party's assemblies and resign them using the first party's private key. The modified assemblies would then appear as if they came from the first party. Of course, this problem could be addressed by the first party resigning the assemblies with a new and/or stronger identity private key and/or using a stronger algorithm. This approach, however, would change the identity of the assemblies and would therefore require rebuilding each assembly that references the assemblies (so that the manifest correctly identifies the assemblies). As can be seen, rebuilding each assembly is impractical especially given that many strong named assemblies are shared assemblies used by many applications.

BRIEF SUMMARY

The present invention extends to methods, systems, and computer program products for updating signature algorithms used for signing an assembly with a strong name without changing the identity of the assembly. The present invention enables an assembly that has already been given an identity (via strong name signing with an identity public/private key pair) to be resigned with a different public/private key pair without changing the original identity that was based on the identity public/private key pair.

In one embodiment, an updated signature key is used to sign an assembly with a strong name without modifying the identity of the assembly after the assembly has been released for use within a runtime. In this embodiment, an assembly is received and signed with a strong name using an identity public/private key pair by: (1) assigning an identity to the assembly, the identity comprising an identifier of the assembly and the identity public key; (2) creating a cryptographic digest of the contents of the assembly; (3) creating a digital signature of the cryptographic digest using the identity private key; (4) storing the identity and the digital signature in the assembly; and (5) releasing the assembly with the assigned strong name.

At some later time, the assembly is signed with an updated strong name using a signature public/private key pair without modifying the identity of the assembly by: (1) creating an updated digital signature of the cryptographic digest of the assembly using the signature private key; (2) creating a counter signature for the assembly that includes the signature public key and a digital signature of the signature public key using the identity private key; and (3) storing within the assembly the identity, the updated digital signature of the cryptographic digest, and the counter signature. Finally, the assembly is released with the updated strong name.

In another embodiment, the identity of an assembly with an updated strong name is validated. In this embodiment, an assembly is received. The assembly has an identity comprising an identifier of the assembly and an identity public key of an identity public/private key pair. The assembly also has an updated strong name comprising a digital signature of a cryptographic digest of the contents of the assembly using a signature private key of a signature public/private key pair. The identity of the assembly is verified by: (1) extracting the identity public key from the identity of the assembly and a counter signature from the assembly, the counter signature comprising the signature public key and a digital signature of the signature public key using the identity private key; (2) using the identity public key to verify that the digital signature of the signature public key was generated using the identity private key; (3) after verifying that the digital signature of the signature public key was generated using the identity private key, decrypting the digital signature of the cryptographic digest of the contents of the assembly using the signature public key; (4) creating a cryptographic digest of the contents of the assembly; (5) comparing the created cryptographic digest to the decrypted cryptographic digest; and (6) validating the identity of the assembly upon determining that the created cryptographic digest is the same as the decrypted cryptographic digest.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The present invention extends to methods, systems, and computer program products for updating signature algorithms used for signing an assembly with a strong name without changing the identity of the assembly. The present invention enables an assembly that has already been given an identity (via strong name signing with an identity public/private key pair) to be resigned with a different public/private key pair without changing the original identity that was based on the identity public/private key pair.

In one embodiment, an updated signature key is used to sign an assembly with a strong name without modifying the identity of the assembly after the assembly has been released for use within a runtime. In this embodiment, an assembly is received and signed with a strong name using an identity public/private key pair by: (1) assigning an identity to the assembly, the identity comprising an identifier of the assembly and the identity public key; (2) creating a cryptographic digest of the contents of the assembly; (3) creating a digital signature of the cryptographic digest using the identity private key; (4) storing the identity and the digital signature in the assembly; and (5) releasing the assembly with the assigned strong name.

At some later time, the assembly is signed with an updated strong name using a signature public/private key pair without modifying the identity of the assembly by: (1) creating an updated digital signature of the cryptographic digest of the assembly using the signature private key; (2) creating a counter signature for the assembly that includes the signature public key and a digital signature of the signature public key using the identity private key; and (3) storing within the assembly the identity, the updated digital signature of the cryptographic digest, and the counter signature. Finally, the assembly is released with the updated strong name.

In another embodiment, the identity of an assembly with an updated strong name is validated. In this embodiment, an assembly is received. The assembly has an identity comprising an identifier of the assembly and an identity public key of an identity public/private key pair. The assembly also has an updated strong name comprising a digital signature of a cryptographic digest of the contents of the assembly using a signature private key of a signature public/private key pair. The identity of the assembly is verified by: (1) extracting the identity public key from the identity of the assembly and a counter signature from the assembly, the counter signature comprising the signature public key and a digital signature of the signature public key using the identity private key; (2) using the identity public key to verify that the digital signature of the signature public key was generated using the identity private key; (3) after verifying that the digital signature of the signature public key was generated using the identity private key, decrypting the digital signature of the cryptographic digest of the contents of the assembly using the signature public key; (4) creating a cryptographic digest of the contents of the assembly; (5) comparing the created cryptographic digest to the decrypted cryptographic digest; and (6) validating the identity of the assembly upon determining that the created cryptographic digest is the same as the decrypted cryptographic digest.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
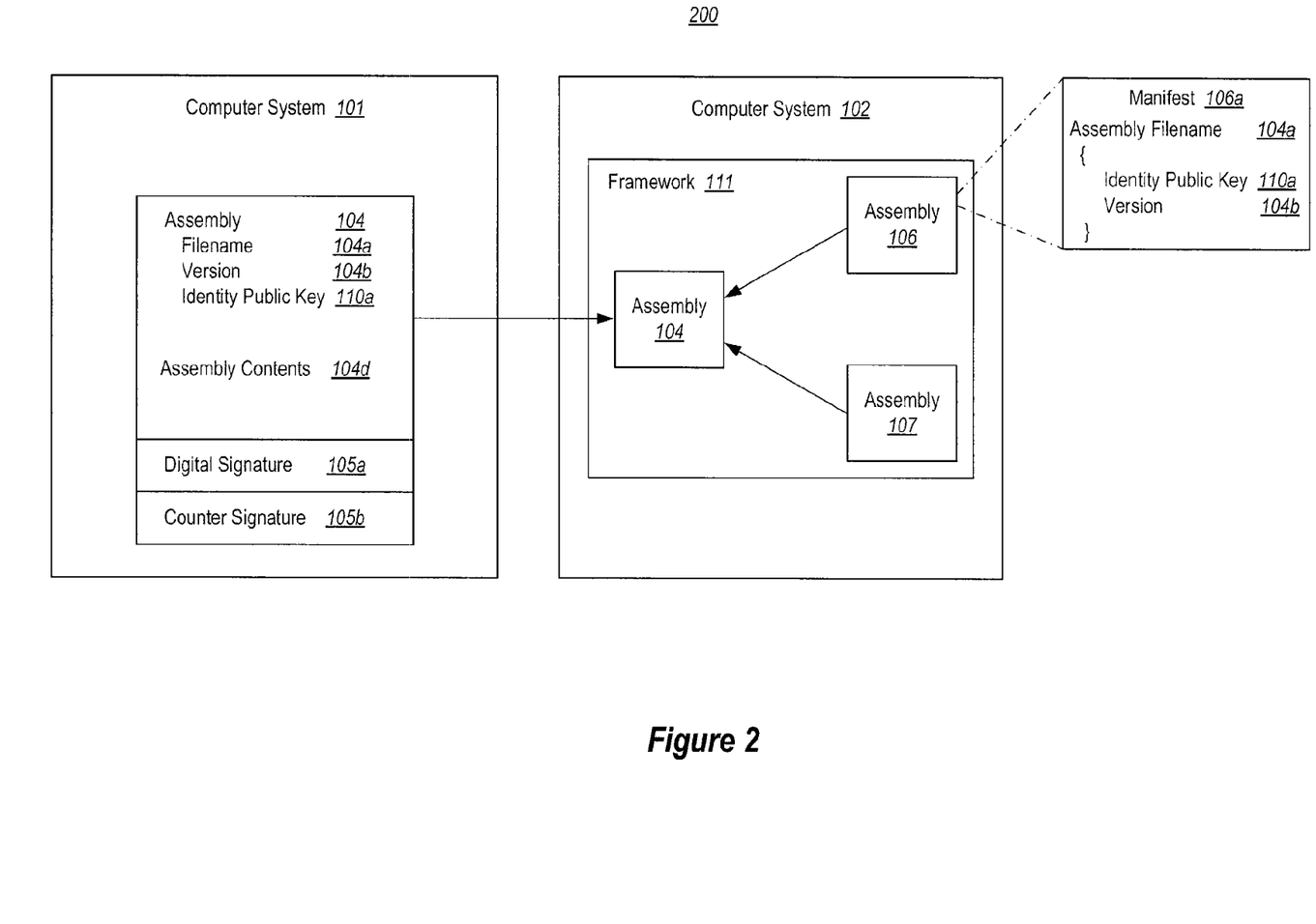
FIG. 2 illustrates an example computer architecture in which assemblies with updated strong names are used.

FIG. 2 illustrates an example computer architecture 200 that facilitates updating signature algorithms used for signing an assembly with a strong name without changing the identity of the assembly. Computer architecture 200 can be the same as computer architecture 100 described in FIG. 1. Referring to FIG. 2, computer architecture 200 includes computer system 101 and computer system 102. Computer system 101 depicts the computer system where assembly 104 is signed with a strong name while computer system 102 depicts the computer system where assembly 106 is being executed in framework 111. Computer architecture 200 is arbitrary in that, where an assembly is created, signed, loaded, or executed is not essential to the invention. For example, assembly 104 can be signed on computer system 101 and then later loaded by the same computer system. In other words, any computer system having the appropriate framework can implement the features of the present invention.

Each of the depicted computer systems is connected to one another over (or is part of) a network, such as, for example, a Local Area Network ("LAN"), a Wide Area Network ("WAN"), and even the Internet. Accordingly, each of the depicted computer systems as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

In a typical implementation, computer system 102 represents many different computer systems. In one specific example, computer system 102 can represent any computer having the .NET framework. In this example, assembly 104 can be a dynamic link library created by any company (e.g.

Microsoft or any other) for use by various applications or components that run on the .NET framework. The reference to the .NET framework in this specification should not be interpreted as limiting the invention to the .NET framework. As one of skill in the art will understand, the techniques of the invention can be applied to any container of code whether it be an assembly, library, or other file, to provide a strong name for uniquely identifying and validating the identity of such containers.

FIG. 2 is an extension of FIG. 1 and illustrates how an assembly that has already been signed with a strong name using an identity public/private key pair (as depicted in FIG. 1) can be signed with a different public/private key pair to strengthen the strong name without changing the identity of the assembly. As described with respect to FIG. 1, an assembly can be given an identity that is based on an identifier (e.g. filename and version) of the assembly as well as an identity public key. The present invention maintains this identity of the assembly while allowing the public/private key pair and/or the algorithm used to sign the assembly to be updated.

As shown in FIG. 2, this is accomplished using a counter signature. FIG. 2 differs from FIG. 1 in that assembly 104 in FIG. 1 includes a single digital signature 105 whereas assembly 104 in FIG. 2 includes a digital signature 105a and a counter signature 105b.

Digital signature 105a, like digital signature 105, is generated from the cryptographic digest of the assembly contents 104d. However, digital signature 105a is generated using an updated private key referred to as the signature private key of a signature public/private key pair.

Counter signature 105b is used to link the identity of assembly 104 to the new signature public/private key pair. Counter signature 105b comprises the signature public key and a digital signature of the signature public key using the identity private key. As is more fully explained below, by signing the signature public key with the identity private key, a link is created between the signature public/private key pair (used to update the strong name of the assembly) and the identity public/private key pair (which define the identity of the assembly).

Figure 3:
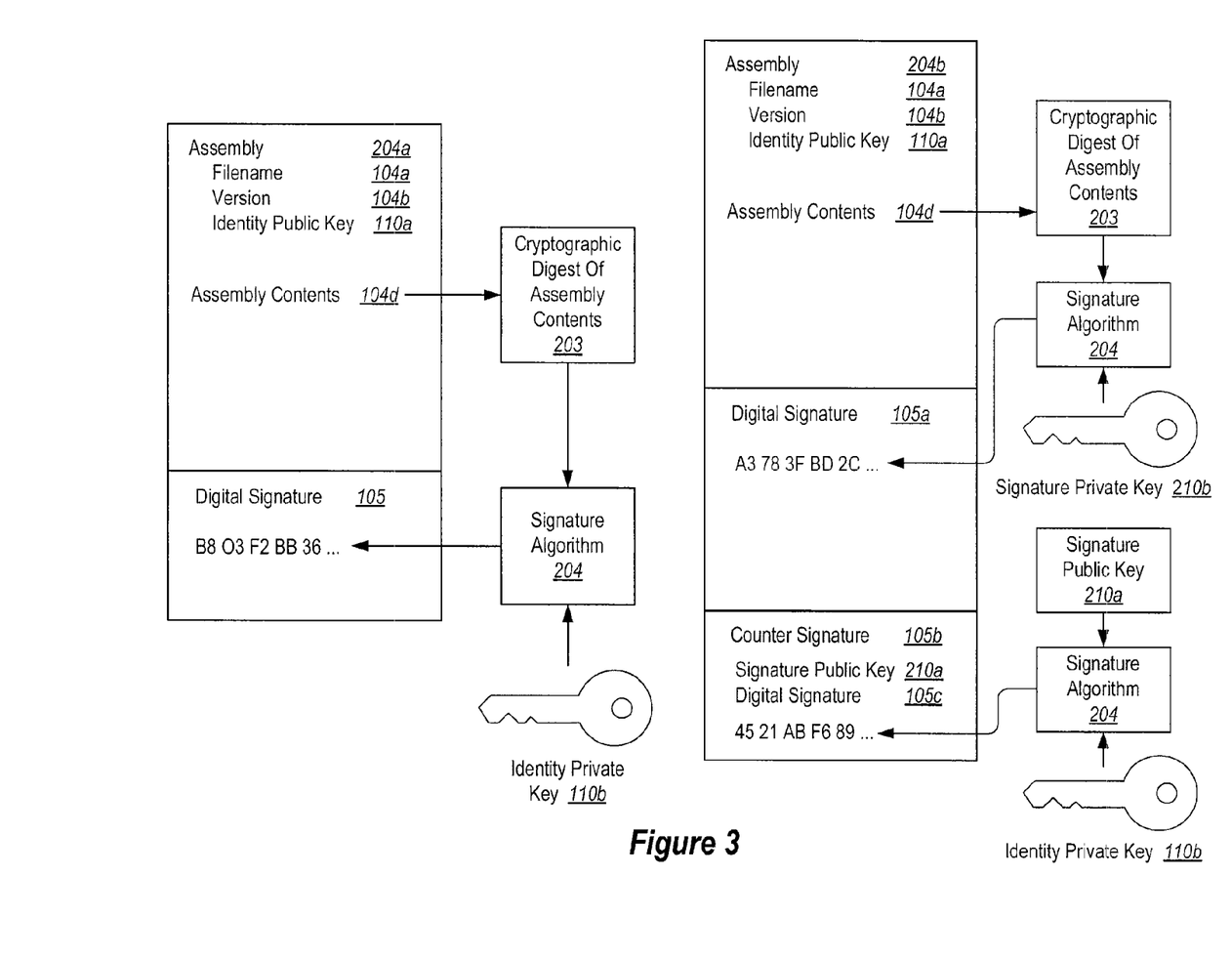
FIG. 3 illustrates how strong names are assigned to assemblies.

FIG. 3 illustrates two copies of assembly 104. The first copy, assembly 204a, corresponds to assembly 104 when signed with a strong name using the identity public/private key pair as depicted in FIG. 1. The second copy, assembly 204b, corresponds to assembly 104 when signed with an updated strong name using the signature public/private key pair as depicted in FIG. 2. In a typical implementation, copy 204b would be released as a replacement for copy 204a.

In FIG. 3, signature algorithm 204 is shown as a box having two inputs and an output. A first input is the data to be signed and is shown as a box whereas the second input is the key used to sign the data and is shown as a key. Also, although signature algorithm 204 is shown as being used to generate each digital signature, a different signature algorithm could be used to generate any of the digital signatures. For example, a stronger signature algorithm may be used to generate digital signatures 105a and 105c in copy 204b of assembly 104.

As shown, digital signature 105 in copy 204a is generated from a cryptographic digest 203 of assembly contents 104d. Cryptographic digest 203 is signed by signature algorithm 204 using identity private key 110b to generate digital signature 105.

Similarly, digital signature 105a in copy 204b is generated from cryptographic digest 203 of assembly contents 104d. However, cryptographic digest 203 is signed by signature algorithm 204 using signature private key 210b to generate digital signature 105a. Because signature private key 210b is more secure than identity private key 110b, digital signature 105a is stronger than digital signature 105.

Without counter signature 105b, the identity of copy 204b of assembly 104 could not be verified using digital signature 105a without rebuilding all assemblies that referenced assembly 104. This is because framework 111 would decrypt digital signature 105a using identity public key 110a, and as further described below, compare the decrypted digital signature to a framework generated cryptographic digest of assembly contents 104d. In this scenario, because framework 111 would be using a different key pair (identity key pair 110a-110b) than was used to sign digital signature 105a (signature key pair 210a-210b), this comparison would fail preventing assembly 104 from being loaded.

Counter signature 105b provides the link between the original identity of assembly 104 and the new signature key pair 210a-210b being used to sign assembly 104 with a strong name. As shown in FIG. 3, counter signature 105b comprises signature public key 210a as well as a digital signature 105c of signature public key 210a. Digital signature 105c is generated by signing signature public key 210a with identity private key 110b using signature algorithm 204 (or another algorithm).

As can be seen in FIG. 3, the identity of assembly 104 remains the same in both copies 204a and 204b. Specifically, identity public key 110a is used in both copies in conjunction with filename 104a and version 104b to uniquely identify assembly 104. In this way, copy 204b of assembly 104 can be made available to applications (e.g. other assemblies) that have already been built against copy 204a of assembly 104. In other words, such applications will still be able to identify assembly 104 because assembly 104's identity has not changed even though it has been signed with an updated strong name. The process of validating an assembly with an updated strong name will now be described.

Referring again to FIG. 1, when assembly 106 is built against assembly 104, an entry is created in manifest 106a that uniquely identifies assembly 104. After being built, anytime assembly 106 is executed, framework 111 uses manifest 106a to determine which assemblies are referenced by assembly 106 and therefore need to be loaded. Framework 111 determines that assembly 104 should be loaded based on the entry in manifest 106a which identifies assembly 104 based on filename 104a, version 104b, and identity public key 110a. For this reason, for assembly 106 to execute, framework 111 must be able to identify assembly 104 and validate its identity.

If, however, a copy of assembly 104 were resigned with a different identity key (e.g. a stronger identity key), the copy would no longer have the same identity as indicated in manifest 106a. Accordingly, framework 111 would not be able to load the copy of assembly 104 when assembly 106 is executed. For this reason, the present invention includes counter signature 105b in a copy of the assembly that is signed with an updated strong name to create an association between the original identity and the new signature key pair.

Referring to FIGS. 2 and 3, after copy 204b of assembly 104 is distributed to be used in place of copy 204a, when framework 111 executes assembly 106, it accesses manifest 106a to determine which assemblies need to be loaded. Framework 111 then looks for an assembly having the identity defined within the entry in manifest 106a. Because copy 204b has the same identity as copy 204a, framework 111 will still locate copy 204b.

Prior to loading copy 204b of assembly 104, framework 111 attempts to validate the identity of assembly 104 using identity public key 110a as defined in manifest 106a. This validation is performed by extracting digital signature 105c from counter signature 105b and decrypting digital signature 105c using identity public key 110a. Because digital signature 105c was generated by signing signature public key 210a with identity private key 110b, this decrypting will yield signature public key 210a.

Because the signature public key included in counter signature 105b matches the signature public key obtained by decrypting digital signature 105c with identity public key 110a, it is known that digital signature 105c was generated using identity private key 110b. In this way, it is verified that signature public key 210a is a valid key for verifying the identity of assembly 104.

After the validity of signature public key 210a has been established, framework 111 then uses signature public key 210a to validate the identity of copy 204b in much the same way as identity public key 110a was used previously to validate the identity of copy 204b. Specifically, framework 111 generates a cryptographic digest 203 of assembly contents 104d, and decrypts digital signature 105a using signature public key 210a. If the generated cryptographic digest matches the decrypted digital signature 105a, it is known that digital signature 105a was created using signature private key 210b, and therefore, copy 204b is validated.

Figure 4:
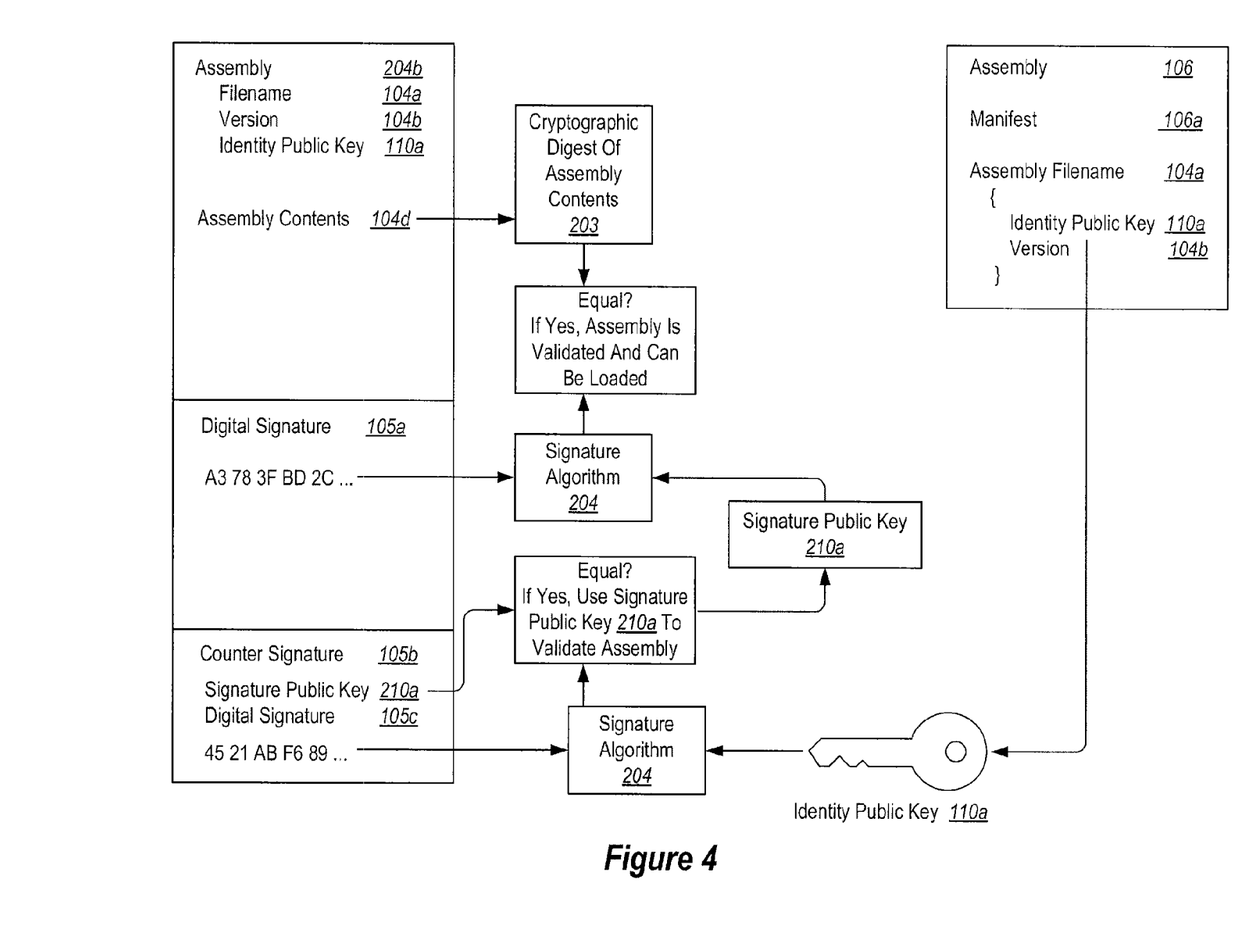
FIG. 4 illustrates how an assembly with an updated strong name is validated.

FIG. 4 provides a more detailed diagram of the various operations performed during this validation process. As shown, assembly 106 includes a manifest indicating that assembly 106 was built against assembly 104. When assembly 106 is executed, framework 111 searches for an assembly matching the identity defined in manifest 106a. In this example, framework 111 will find copy 204b of assembly 104 (because copy 204b has been released as a replacement to copy 204a and has the same identity).

To verify the identity of copy 204b, framework 111 first uses the identity public key 110a (which defines the original identity of assembly 104) to decrypt digital signature 105c. FIG. 4 illustrates that signature algorithm 204 is used to decrypt digital signature 105c, however, as stated above, different signature algorithms can be used. If the result of decrypting digital signature 105c with identity public key 110a is the same as signature public key 210a in counter signature 105b, it is known that digital signature 105c was generated with identity private key 110b.

Signature public key 210a is then used to decrypt digital signature 105a. Framework 111 also generates a cryptographic digest 203 of assembly contents 104d. The result of decrypting digital signature 105a is compared to cryptographic digest 203. If they are equal, it is known that digital signature 105a was created using signature private key 210b thereby validating copy 204b of assembly 104.

As can be seen, if it is feared that a company's identity private key has been compromised (or that the signing algorithm has been cracked), the company can use a stronger key to sign its assemblies while still using the original identity public key to uniquely identify the assemblies. One benefit of this approach, as described, is that the assemblies that have been built against a strong name assembly do not need to be modified (e.g. rebuilt) when a new strong name is applied to the strong name assembly.

Another feature provided by the present invention is the ability to prevent the loading of an assembly whose strong name has been broken. In other words, if it is known that the identity private key or the algorithm used to sign an assembly with a strong name has been compromised, the present invention allows a notification to be sent out to framework 111 indicating that any assembly signed with the compromised identity private key should not be loaded unless the assembly has been signed with an updated signature key.

For example, referring to FIG. 1, if it is known that identity private key 110b has been compromised, a notification can be sent informing framework 111 that any assembly identified by identity public key 110a should not be loaded unless the assembly has an updated strong name. Framework 111 can implement this functionality by requiring that a counter signature be found in such assemblies as described above. Such notifications can be obtained periodically or on demand, for example, using an update service such as Windows Update.

Figure 5:
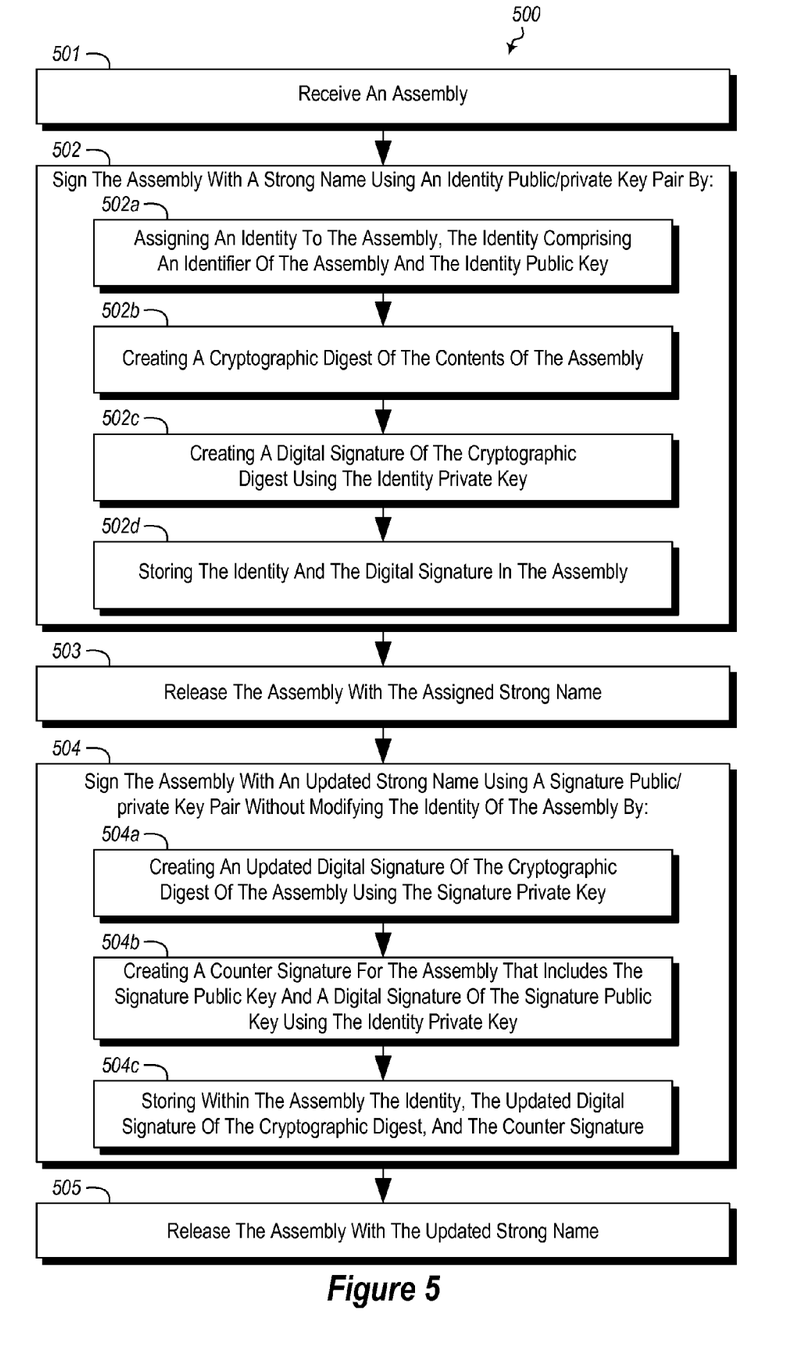
FIG. 5 illustrates a flow chart of an example method for using an updated signature key to sign an assembly with a strong name without modifying the identity of the assembly.

FIG. 5 illustrates a flow chart of an example method 500 for using an updated signature key to sign an assembly with a strong name without modifying the identity of the assembly. Method 500 will be described with respect to FIG. 3.

Method 500 includes an act 501 of receiving an assembly. For example, copy 204a of assembly 104 can be received by any tool, module, component, etc. that is configured to sign an assembly with a strong name.

Method 500 includes an act 502 of signing the assembly with a strong name using an identity public/private key pair. For example, copy 204a of assembly 104 can be signed with a strong name using identity public/private key pair 110a-110b.

Act 502 includes sub-act 502a of assigning an identity to the assembly, the identity comprising an identifier of the assembly and the identity public key. For example, the identity of assembly 104 can be file name 104a, version 104b, and identity public key 110a.

Act 502 includes sub-act 502b of creating a cryptographic digest of the contents of the assembly. For example, cryptographic digest 203 of assembly contents 104d can be created.

Act 502 includes sub-act 502c of creating a digital signature of the cryptographic digest using the identity private key. For example, digital signature 105 can be created by signing cryptographic digest 203 with identity private key 110b.

Act 502 includes sub-act 502d of storing the identity and the digital signature in the assembly. For example, filename 104a, version 104b, and identity public key 110a can be stored within copy 204a as the identity of assembly 104. Digital signature 105 can also be stored in copy 204a of assembly 104.

Method 500 includes act 503 of releasing the assembly with the assigned strong name. For example, copy 204a of assembly 104 can be released.

Method 500 includes an act 504 of signing the assembly with an updated strong name using a signature public/private key pair without modifying the identity of the assembly. For example, copy 204b of assembly 104 can be signed with an updated strong name using signature public/private key pair 210a-210b without modifying the identity of assembly 104.

Act 504 includes sub-act 504a of creating an updated digital signature of the cryptographic digest of the assembly using the signature private key. For example, digital signature 105a can be created by signing cryptographic digest 203 using signature private key 210b.

Act 504 includes sub-act 504b of creating a counter signature for the assembly that includes the signature public key and a digital signature of the signature public key using the identity private key. For example, counter signature 105b can comprise signature public key 210a and digital signature 105c. Digital signature 105c can be generated by signing signature public key 210a with identity private key 110b.

Act 504 includes sub-act 504c of storing within the assembly the identity, the updated digital signature of the cryptographic digest, and the counter signature. For example, filename 104a, version 104b, and identity public key 110a can be stored within copy 204b as the identity of assembly 104.

Digital signature 105a and counter signature 105b can also be stored in copy 204b of assembly 104.

Method 500 includes an act 505 of releasing the assembly with the updated strong name. For example, copy 204b of assembly 104 can be released.

Figure 6:
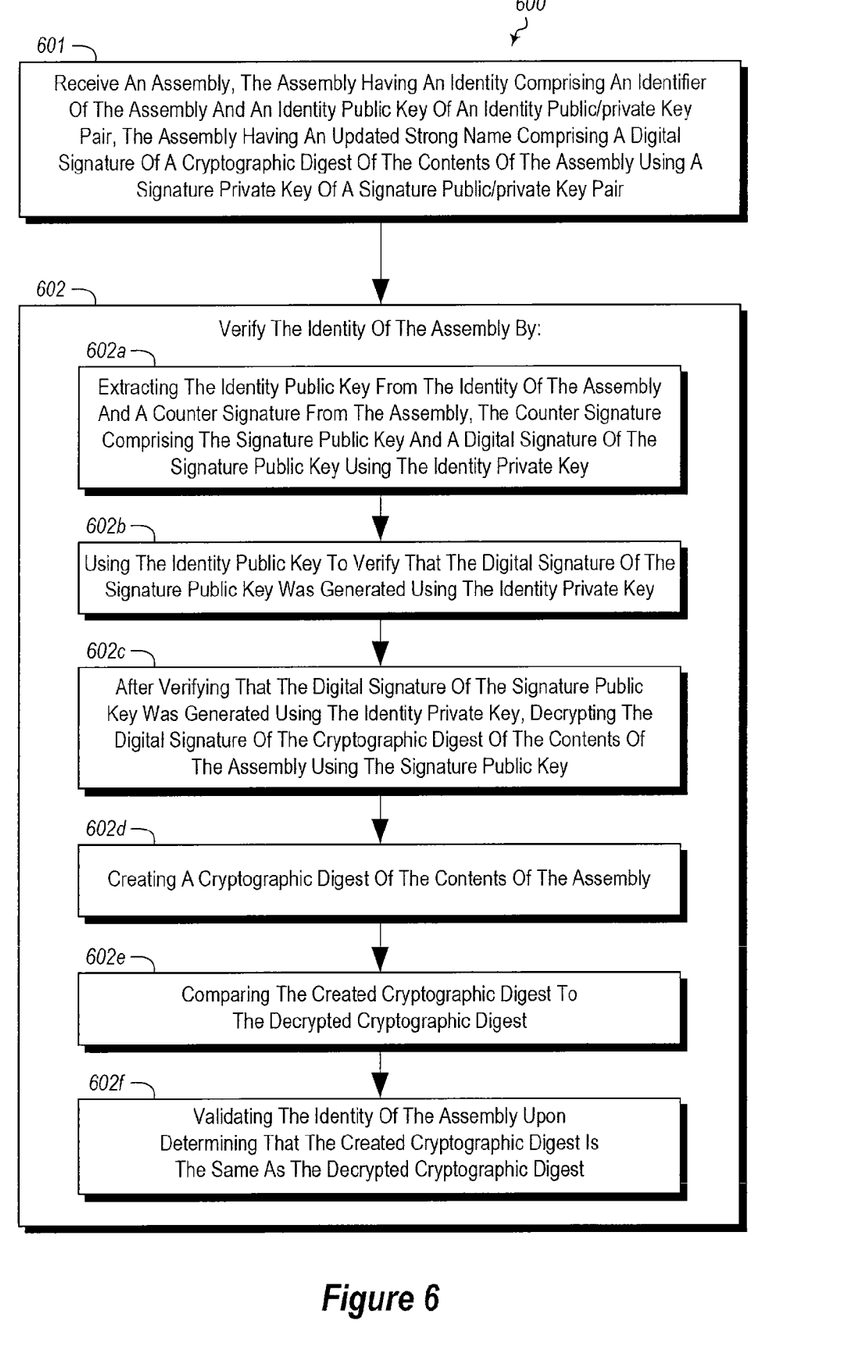
FIG. 6 illustrates a flow chart of an example method for validating the identity of an assembly that has an updated strong name.

FIG. 6 illustrates a flow chart of an example method 600 for validating the identity of an assembly that has an updated strong name. Method 600 will be described with respect to FIGS. 2 and 4.

Method 600 includes an act 601 of receiving an assembly. The assembly has an identity comprising an identifier of the assembly and an identity public key of an identity public/private key pair. The assembly also has an updated strong name comprising a digital signature of a cryptographic digest of the contents of the assembly using a signature private key of a signature public/private key pair. For example, copy 204b of assembly 104 can be received at framework 111. Copy 204b can include filename 104a, version 104b, and identity public key 110a. Copy 204b can also include digital signature 105a and counter signature 105b.

Method 600 includes an act 602 of verifying the identity of the assembly. Act 602 includes sub-act 602a of extracting the identity public key from the identity of the assembly and a counter signature from the assembly. The counter signature comprises the signature public key and a digital signature of the signature public key using the identity private key. For example, identity public key 110a and counter signature 105b, including digital signature 105c, can be extracted from copy 204b.

Act 602 includes sub-act 602b of using the identity public key to verify that the digital signature of the signature public key was generated using the identity private key. For example, digital signature 105c can be decrypted using identity public key 110a and compared to signature public key 210a.

Act 602 includes sub-act 602c of after verifying that the digital signature of the signature public key was generated using the identity private key, decrypting the digital signature of the cryptographic digest of the contents of the assembly using the signature public key. For example, if decrypted digital signature 105c is the same as signature public key 210a, signature public key 210a can be used to decrypt digital signature 105a.

Act 602 includes sub-act 602d of creating a cryptographic digest of the contents of the assembly. For example, cryptographic digest 203 can be generated from assembly contents 104d.

Act 602 includes sub-act 602e of comparing the created cryptographic digest to the decrypted cryptographic digest. For example, decrypted digital signature 105a can be compared to cryptographic digest 203.

Act 602 includes sub-act 602f of validating the identity of the assembly upon determining that the created cryptographic digest is the same as the decrypted cryptographic digest. For example, if decrypted digital signature 105a is the same as cryptographic digest 203, copy 204b of assembly 104 is validated.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope. For example, an implementation that employs the techniques of the invention, but uses a designation other than assembly to define a container of code or a designation other than framework to define an execution environment should not be excluded from the scope of the claims.

What is claimed:

1. A computer-implemented method for resigning an assembly which represents portions of code identified in a framework library, the assembly's access being protected in a first instance by signing the assembly with a strong name and then releasing the assembly for use by one or more applications executed by a runtime of the framework, and the computer-implemented method causing access to the assembly to be further secured after the first instance by resigning the assembly with a further strong name, but without modifying an original identity of the assembly so that applications can continue to identify the assembly using the original identity even after the assembly is resigned with the further strong name, the computer-implemented method being performed by one or more processors which perform the implemented method, which comprises:

retrieving from a framework library an original assembly which represents portions of code in the framework library identified for execution by one or more applications when executed by a runtime of the framework, access to the retrieved original assembly having been protected in the first instance prior to its release for use by one or more applications by signing the original assembly with a strong name, and the strong name comprising, i) an original identifier for the original assembly, ii) an identity public key from an identity public key/identity private key pair, and iii) a digital signature which is prepared by generating a cryptographic digest of the original assembly contents, which is then signed, by means of a signature algorithm, with an identity private key of the identity public key/identity private key pair;

further securing access to the retrieved original assembly by replacing the original assembly with a copy of the original assembly that is resigned with an updated strong name that uses a new signature public key/signature private key pair, the updated strong name comprising, i) the original identifier for the original assembly, ii) the original identity public key, iii) a first updated digital signature which is prepared by generating a cryptographic digest of the copy of the original assembly contents, which is then signed, by means of the signature algorithm, with the signature private key of the new signature public key/signature private key pair, and iv) a counter signature which is comprised of the signature public key from the new signature public key/signature private key pair, and a second updated digital signature prepared by signing the signature public key, by means of the signature algorithm, with the original identity private key from the identity public key/identity private key pair; and using the counter signature to link the original identifier of the original assembly to the new signature public key/signature private key pair, and then providing access to the copy of the original assembly when running an application on the framework runtime which identifies the copy of the original assembly using the original identifier.

2. The method of claim 1, wherein the original identifier of the original assembly comprises a name and a version of the original assembly.

3. The method of claim 1, wherein the cryptographic digest comprises a hash of the contents of the original assembly.

4. The method of claim 1, wherein the original identifier of the original assembly and the digital signature of the original assembly are stored as metadata for the original assembly.

5. The method of claim 1, further comprising distributing a notification that the identity public key is no longer valid for securing access to the original assembly.

6. The method of claim 5, wherein the notification causes any subsequent assembly that references the original identifier for the original assembly, and that also includes with the subsequent assembly the identity public key, to be prevented from being loaded at runtime.

7. The method of claim 1, wherein the signature algorithm used for signing at least one of the first and second updated digital signatures is different than the signature algorithm used for signing the digital signature of the original assembly.

8. The method of claim 1, wherein using the counter signature to link the original identifier of the original assembly to the new signature public key/signature private key pair, comprises verifying the original identifier of the copy of the original assembly by performing the following:
    extracting the original identity public key from the copy of the original assembly;
    extracting the counter signature from the copy of the original assembly;
    using the extracted original identity public key to verify that the second updated digital signature was prepared by using the identity private key to sign the signature public key;
    after performing the verification that the second updated digital signature was prepared by using the identity private key to prepare the second updated digital signature for the signature public key, using signature public key to decrypt the first updated digital signature to verify that the signature private key was used to prepare the first updated digital signature for the cryptographic digest for the contents of the copy of the assembly, and then accessing the cryptographic digest;
    after verifying the signature private key's use to digitally sign the cryptographic digest for the contents of the copy of the assembly, preparing a second cryptographic digest for the contents of the copy of the assembly;
    comparing the second cryptographic digest with the accessed cryptographic digest; and
    validating the original identifier of the copy of the assembly if the comparison shows that the contents of the accessed cryptographic digest and second cryptographic digest are the same.

9. The method of claim 8, wherein using the counter signature to link the original identifier of the original assembly to the new signature public key/signature private key pair, comprises verifying the original identifier of the copy of the original assembly at runtime, and loading the copy of the original assembly after the original identifier of the copy of the assembly has been validated.

10. The method of claim 9, wherein prior to loading the copy of the original assembly, the following is performed:
    accessing a manifest for an assembly that is different than the copy of the original assembly;
    determining that the manifest includes a reference to the original identifier of the original assembly; and
    retrieving the copy of original assembly based on reference to the original identifier.

11. The computer program product of claim 10, wherein the manifest is created during a build of the assembly that is different than the copy of the original assembly, and the build is performed against the copy of the original assembly.

12. A computer program product consisting of one or more hardware storage devices containing computer-executable code which, when executed by one or more processors of a computing system, cause the computing system to implement a computer-implemented method for resigning an assembly which represents portions of code identified in a framework library, the assembly's access being protected in a first instance by signing the assembly with a strong name and then releasing the assembly for use by one or more applications executed by a runtime of the framework, and the computer-implemented method causing access to the assembly to be further secured after the first instance by resigning the assembly with a further strong name, but without modifying an original identity of the assembly so that applications can continue to identify the assembly using the original identity even after the assembly is resigned with the further strong name, the computer-implemented method comprising:
    retrieving from a framework library an original assembly which represents portions of code in the framework library identified for execution by one or more applications when executed by a runtime of the framework, access to the retrieved original assembly having been protected in the first instance prior to its release for use by one or more applications by signing the original assembly with a strong name, and the strong name comprising
        i) an original identifier for the original assembly,
        ii) an identity public key from an identity public key/identity private key pair, and
        iii) a digital signature which is prepared by generating a cryptographic digest of the original assembly contents, which is then signed, by means of a signature algorithm, with an identity private key of the identity public key/identity private key pair;
    further securing access to the retrieved original assembly by replacing the original assembly with a copy of the original assembly that is resigned with an updated strong name that uses a new signature public key/signature private key pair, the updated strong name comprising
        i) the original identifier for the original assembly,
        ii) the original identity public key,
        iii) a first updated digital signature which is prepared by generating a cryptographic digest of the copy of the original assembly contents, which is then signed, by means of the signature algorithm, with the signature private key of the new signature public key/signature private key pair, and
        iv) a counter signature which is comprised of the signature public key from the new signature public key/signature private key pair, and a second updated digital signature prepared by signing the signature public key, by means of the signature algorithm, with the original identity private key from the identity public key/identity private key pair; and
    using the counter signature to link the original identifier of the original assembly to the new signature public key/signature private key pair, and then providing access to the copy of the original assembly when running an application on the framework runtime which identifies the copy of the original assembly using the original identifier.

13. The computer program product of claim 12, wherein the original identifier of the original assembly comprises a name and a version of the original assembly.

14. The computer program product of claim 12, wherein the cryptographic digest comprises a hash of the contents of the original assembly.

15. The computer program product of claim 12, wherein the original identifier of the original assembly and the digital signature of the original assembly are stored as metadata for the original assembly.

16. The computer program product of claim 12, wherein the computer-implemented method further comprises distributing a notification that the identity public key is no longer valid for securing access to the original assembly.

17. The computer program product of claim 16, wherein the notification causes any subsequent assembly that references the original identifier for the original assembly, and that also includes with the subsequent assembly the identity public key, to be prevented from being loaded at runtime.

18. The computer program product of claim 12, wherein the signature algorithm used for signing at least one of the first and second updated digital signatures is different than the signature algorithm used for signing the digital signature of the original assembly 19. The computer program product of claim 12, wherein using the counter signature to link the original identifier of the original assembly to the new signature public key/signature private key pair, comprises verifying the original identifier of the copy of the original assembly by performing the following:
    extracting the original identity public key from the copy of the original assembly;
    extracting the counter signature from the copy of the original assembly;
    using the extracted original identity public key to verify that the second updated digital signature was prepared by using the identity private key to sign the signature public key;
    after performing the verification that the second updated digital signature was prepared by using the identity private key to prepare the second updated digital signature for the signature public key, using signature public key to decrypt the first updated digital signature to verify that the signature private key was used to prepare the first updated digital signature for the cryptographic digest for the contents of the copy of the assembly, and then accessing the cryptographic digest;
    after verifying the signature private key's use to digitally sign the cryptographic digest for the contents of the copy of the assembly, preparing a second cryptographic digest for the contents of the copy of the assembly;
    comparing the second cryptographic digest with the accessed cryptographic digest; and
    validating the original identifier of the copy of the assembly if the comparison shows that the contents of the accessed cryptographic digest and second cryptographic digest are the same.

20. The computer program product of claim 19, wherein using the counter signature to link the original identifier of the original assembly to the new signature public key/signature private key pair, comprises verifying the original identifier of the copy of the original assembly at runtime, and loading the copy of the original assembly after the original identifier of the copy of the assembly has been validated.

21. The computer program product of claim 20, wherein prior to loading the copy of the original assembly, the following is performed:
    accessing a manifest for an assembly that is different than the copy of the original assembly;
    determining that the manifest includes a reference to the original identifier of the original assembly; and
    retrieving the copy of original assembly based on reference to the original identifier.

22. The computer program product of claim 21, wherein the manifest is created during a build of the assembly that is different than the copy of the original assembly, and the build is performed against the copy of the original assembly.

* * * * *